United States Patent
Tanaka (10) Patent No.: US 11,987,910 B2
(45) Date of Patent: May 21, 2024

(54) BASE CLOTH FOR MATERIAL AND MANUFACTURING METHOD THEREFOR

(71) Applicant: Asahi Kasei Kabushiki Kaisha, Tokyo (JP)

(72) Inventor: Takeshi Tanaka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 57 days.

(21) Appl. No.: 17/911,243

(22) PCT Filed: Mar. 26, 2021

(86) PCT No.: PCT/JP2021/013109
§ 371 (c)(1),
(2) Date: Sep. 13, 2022

(87) PCT Pub. No.: WO2021/193966
PCT Pub. Date: Sep. 30, 2021

(65) Prior Publication Data
US 2023/0099686 A1      Mar. 30, 2023

(30) Foreign Application Priority Data
Mar. 26, 2020    (JP) .................... 2020-056760

(51) Int. Cl.
*D03D 3/00* (2006.01)
*D03D 15/283* (2021.01)
(Continued)

(52) U.S. Cl.
CPC ............. *D03D 3/00* (2013.01); *D03D 15/283* (2021.01); *D03D 15/573* (2021.01);
(Continued)

(58) Field of Classification Search
CPC ...... D03D 3/00; D03D 15/283; D03D 15/573; D03D 1/02; D03D 15/58; D03D 13/008;
(Continued)

(56) References Cited

U.S. PATENT DOCUMENTS

| 5,650,207 A | 7/1997 | Crouch |
| 6,135,161 A | 10/2000 | Nakano et al. |

(Continued)

FOREIGN PATENT DOCUMENTS

| JP | H11-129846 A | 5/1999 |
| JP | 2000-328388 A | 11/2000 |

(Continued)

OTHER PUBLICATIONS

European Search Report issued in corresponding European Patent Application No. 21776257.4 dated Aug. 1, 2023.

(Continued)

*Primary Examiner* — Robert H Muromoto, Jr.
(74) *Attorney, Agent, or Firm* — Morgan, Lewis & Bockius LLP (57) ABSTRACT

Provided are a base cloth for a material and a manufacturing method therefor, the base cloth suppressing opening of a boundary portion between an expanding part and a non-expanding part when used in a bag body, having low dynamic air permeability, and being capable of exhibiting the characteristic of being unlikely to burst even at high temperatures. A fabric base cloth for a material according to the present invention is composed of fibers having a prescribed thread breaking strength value, and for which the cloth surface is not subjected to resin coating, laminating, or a resin impregnation treatment.

7 Claims, 2 Drawing Sheets

(51) Int. Cl.
*D03D 15/573* (2021.01)
*B60R 21/16* (2006.01)

(52) U.S. Cl.
CPC ...... *D10B 2331/02* (2013.01); *D10B 2401/00* (2013.01); *D10B 2505/124* (2013.01)

(58) Field of Classification Search
CPC .............. D03D 15/567; D10B 2331/02; D10B 2401/00; D10B 2505/124; D10B 2331/04; D10B 2401/063; B60R 2021/23509; B60R 21/235
See application file for complete search history.

(56) References Cited

U.S. PATENT DOCUMENTS

| | | | | |
|---|---|---|---|---|
| 6,210,519 | B1* | 4/2001 | Heudorfer | B60R 21/235 280/729 |
| 7,013,681 | B1* | 3/2006 | Ternon | D04B 21/165 442/314 |
| 7,618,057 | B2* | 11/2009 | Pinsenschaum | B60R 21/2338 280/730.2 |
| 8,919,810 | B2* | 12/2014 | Kuramoto | B60R 21/235 428/36.1 |
| 9,012,340 | B2* | 4/2015 | Fujiyama | D03D 15/46 139/384 R |
| 9,731,674 | B2* | 8/2017 | Jindal | B60R 21/231 |
| 9,797,071 | B2* | 10/2017 | Kim | D01D 5/16 |
| 9,834,167 | B2* | 12/2017 | Tanaka | B60R 21/235 |
| 10,286,870 | B2* | 5/2019 | Yokoi | D06N 3/128 |
| 10,562,483 | B2* | 2/2020 | Hosaka | B60R 21/235 |
| 11,634,841 | B2* | 4/2023 | Hunt | D06C 15/00 428/36.1 |
| 11,746,446 | B2* | 9/2023 | Sakai | D03D 1/02 442/59 |
| 2006/0040577 | A1* | 2/2006 | Schmitt | D06N 3/186 442/154 |
| 2008/0012275 | A1* | 1/2008 | Pinsenschaum | B60R 21/26 280/730.2 |
| 2008/0174093 | A1* | 7/2008 | Inoue | B60R 21/23138 280/730.2 |
| 2010/0048079 | A1 | 2/2010 | Fujiyama et al. | |
| 2010/0253047 | A1* | 10/2010 | Youn | B60R 21/235 139/384 R |
| 2013/0273344 | A1* | 10/2013 | Kim | D02G 3/446 428/221 |
| 2014/0021705 | A1* | 1/2014 | Youn | D03D 1/02 139/413 |
| 2014/0194021 | A1* | 7/2014 | Kim | D02J 1/22 442/181 |
| 2015/0336530 | A1 | 11/2015 | Tanaka et al. | |
| 2016/0082918 | A1* | 3/2016 | Muzzaffar | B60R 21/235 280/743.1 |
| 2017/0067189 | A1 | 3/2017 | Yokoi | |
| 2017/0072890 | A1* | 3/2017 | Jindal | B60R 21/203 |
| 2018/0208147 | A1* | 7/2018 | Yokoi | D06C 3/10 |
| 2023/0349058 | A1* | 11/2023 | Kajimoto | C25B 13/02 |

FOREIGN PATENT DOCUMENTS

| | | | |
|---|---|---|---|
| JP | 2006-256474 A | 9/2006 | |
| JP | 2008-081873 A | 4/2008 | |
| JP | 2009-235593 A | 10/2009 | |
| JP | 2012-052280 A | 3/2012 | |
| JP | 2015-183309 A | 10/2015 | |
| WO | 2007/148791 A1 | 12/2007 | |
| WO | WO-2012026455 A1 * | 3/2012 | ........... B60R 21/235 |
| WO | 2014/115864 A1 | 7/2014 | |
| WO | 2014/123090 A1 | 8/2014 | |
| WO | 2015/025842 A1 | 2/2015 | |
| WO | 2015/137495 A1 | 9/2015 | |

OTHER PUBLICATIONS

International Search Report issued in corresponding International Patent Application No. PCT/JP2021/013109 dated May 18, 2021.
International Preliminary Report on Patentability and Written Opinion issued in corresponding International Patent Application No. PCT/JP2021/013109 dated Oct. 6, 2022.

* cited by examiner

BASE CLOTH FOR MATERIAL AND MANUFACTURING METHOD THEREFOR

FIELD

The present invention relates to a base cloth for a material and a manufacturing method therefor.

BACKGROUND

In recent years, airbags have become indispensable as safety devices for protecting vehicle occupants. As characteristics required for airbags, tenacity to withstand impact during operation and scratching by peripheral members, airtightness for stable deployment within the required time, and flexibility and compactness for storage in a limited storage space are required. In particular, as a recent trend, strengthening of protection for the A-pillar part against diagonal collisions and support for arbitrary occupant postures due to autonomous driving are being considered, and wider protection is required, and as a result, airbag capacity has increased. Conversely, airbag storage is more restricted due to interior design. Thus, as the volume of an airbag increases, the amount of deployment gas increases, and there is an increasing demand for properties that can withstand a large stress at the boundary between the inflated part and the non-inflated part and exhibit airtightness. Furthermore, it is becoming more necessary to achieve the conflicting characteristics of increasing the volume of the airbag and improving storability. Further, in order to reduce unit cost, pyrotechnic inflators tend to have a higher gas temperature due to the simplification of the structure, and it is necessary to satisfy the above characteristics in deployment in a higher temperature environment.

To solve these problems, Patent Literature 1 below discloses a technology wherein by allowing a specific amount of a specific substance to be present on the fiber surface, friction between single yarns is reduced, and the stress applied to yarn lines during weaving is utilized to promote flattening of the yarn lines, whereby when used as a base cloth, airtightness is increased and storability is increased due to imparted flexibility. However, there are no descriptions of the effect at high temperatures in this literature. Furthermore, it is deemed that this technology may not be sufficient against the generation of stronger stresses on the boundary between the inflated part and the non-inflated part due to recent increases in the size of the airbag, and for maintaining airtightness of the inflator application which generates the higher temperature gas.

Furthermore, Patent Literature 2 below discloses a technology wherein by allowing a specific amount of a substance containing an aromatic to be present on the fiber surface, the friction between the warp and weft yarns when made into a woven fabric is increased, whereby opening of the inflated part and the non-inflated part can be suppressed not only at ambient temperature but also at high temperatures. However, even this technology may not be sufficient against stresses on the inflated part and the non-inflated part of a large-sized bag at high temperatures, and the storability may be impaired due to an increase in inter-fiber friction.

As described above, a base cloth for an airbag which has stable expandability, airtightness, and storability in a large-sized airbag and even when a high-temperature inflator are used has not yet been disclosed.

CITATION LIST

Patent Literature

[PTL 1] Japanese Unexamined Patent Publication (Kokai) No. 2015-183309
[PTL 2] WO 2014/123090

SUMMARY

Technical Problem

In light of the state of the art described above, a problem to be solved by the present invention is to provide a base cloth for a material, for example, a base cloth for an airbag, in which when formed into a bag, opening of the boundary between the inflated part and the non-inflated part is suppressed, dynamic air permeability is low, and the characteristic of a low likelihood of bursting can be exhibited even at high temperatures.

Solution to Problem

As a result of rigorous research and repeated experimentation in order to solve the problem described above, the present inventors have unexpectedly discovered that by adopting the following features, the problem can be solved.

Specifically, the present invention is as described below.
[1] A woven fabric base cloth for a material, which is composed of fibers having a yarn tenacity of 6.6 cN/dtex to 8.5 cN/dtex when dissembled from the base cloth, and in which a cloth surface is not subjected to resin coating, lamination, or a resin impregnation treatment, wherein in a force strain characteristic (FS) curve of constituent fibers obtained by Edgecomb Resistance measurement in accordance with ASTM D6479, for both warp and weft directions, in both 25° C. and 150° C. environments, E1, which is a value obtained by dividing a force amount increased in an strain range of 0.4% to 4.4% by a total cross-sectional area of fibers in the measurement direction, is 3 MPa to 25 MPa, and E2, which is a value obtained by dividing a ratio a force amount increased in an strain range of −4.8% to −0.8% from a fiber cut point by a total cross-sectional area of fibers in the measurement direction, is 10 MPa to 30 MPa.
[2] The woven fabric base cloth for a material according to [1], wherein a dynamic air permeability of a base cloth part when measured, in accordance with ASTM 6476, between 30 kPa and 70 kPa with an initial pressure of 100±5 kPa is 400 mm/s or less.
[3] The woven fabric base cloth for a material according to [1] or [2], wherein a residual oil amount is 200 ppm by weight to 800 ppm by weight with respect to the base cloth.
[4] The woven fabric base cloth for a material according to any one of [1] to [3], wherein a weave structure is a plane weave.
[5] The woven fabric base cloth for a material according to any one of [1] to [4], wherein a raw material of the fibers constituting the base cloth is polyhexamethylene adipamide.
[6] An airbag manufactured using the woven fabric base cloth for a material according to any one of [1] to [5].
[7] A method for manufacturing the woven fabric base cloth for a material according to any one of [1] to [5], comprising the following steps:
  a weaving step;
  a step of not scouring or scouring at 70° C. or less;
  a step of not drying or performing drying at 70° C. or less; and a step of performing heat treatment at 150° C. or higher, wherein at a final stage of the heat treatment, a tightening width is 1% or more relative to a minimum width in heat treatment.

Advantageous Effects of Invention

When the woven fabric base cloth for a material according to the present invention is formed into a bag, opening of the boundary between the inflated part and the non-inflated part is suppressed, the dynamic air permeability is low, and the characteristic of a low likelihood of bursting even at high temperatures can be exhibited.

DESCRIPTION OF EMBODIMENTS

The embodiments of the present invention will be described in detail below.

An embodiment of the present invention provides a woven fabric base cloth for a material, which is composed of fibers having a yarn tenacity of 6.6 cN/dtex to 8.5 cN/dtex when dissembled from the base cloth, and in which a cloth surface is not subjected to resin coating, lamination, or a resin impregnation treatment, wherein in a force strain characteristic (FS) curve of constituent fibers obtained by Edgecomb Resistance measurement in accordance with ASTM D6479, for both warp and weft directions, in both 25° C. and 150° C. environments, E1, which is a value obtained by dividing a force amount increased in an strain range of 0.4% to 4.4% by a total cross-sectional area of fibers in the measurement direction, is 3 MPa to 25 MPa, and E2, which is a value obtained by dividing a ratio a force amount increased in an strain range of −4.8% to −0.8% from a fiber cut point by a total cross-sectional area of fibers in the measurement direction, is 10 MPa to 30 MPa.

Due to such a configuration, the woven fabric base cloth for a material of the present embodiment, when made into a bag, can maintain airtightness from low temperatures to high temperatures, and can suppress opening of the boundary between the inflated part and the non-expanded part, whereby the characteristic of a low likelihood of bursting can be exhibited even at high temperatures.

The woven fabric base cloth for a material of the present embodiment has a yarn (disassembled yarn) tenacity of 6.6 cN/dtex to 8.5 cN/dtex when dissembled from the base cloth. When the disassembled yarn tenacity is 6.6 cN/dtex or more, the bag body, when manufactured and unfolded, can withstand the stress applied to the boundary between the inflated part and the non-inflated part, bursting can be prevented due to the mechanical characteristics thereof. More preferably, the tenacity is 6.8 cN/dtex or more, and further preferably 7.0 cN/dtex or more. The high yarn tenacity means that the orientation of the yarns is high, and the fibers constituting the base cloth do not stretch such that the air permeability of the base cloth can be maintained at a low level and opening of the seams can be suppressed. Conversely, when the disassembled yarn tenacity exceeds 8.5 cN/dtex, the quality of the base cloth may be deteriorated due to breakage of single yarns and the generation of fraying. The force is more preferably 8.0 cN/dtex or less, and further preferably 7.5 cN/dtex or less.

Though the total fineness of the fibers constituting the woven fabric base cloth for a material of the present embodiment is not particularly limited, from the viewpoint of flexibility and storability of the base cloth, it is preferably 135 dtex to 800 dtex, more preferably 215 dtex to 500 dtex, and further preferably 230 dtex to 490 dtex.

Though the single-fiber fineness of the fibers constituting the woven fabric base cloth for a material of the present embodiment is not particular limited, from the viewpoint of flexibility, it is preferably 0.5 dtex to 10 dtex, more preferably 2 dtex to 7 dtex, and further preferably 3 dtex to 6 dtex.

In the woven fabric base cloth for a material of the present embodiment, in a force strain characteristic (FS) curve obtained by Edgecomb Resistance measurement in accordance with ASTM D6479, for both warp and weft yarns, in both 25° C. and 150° C. environments, E1, which is a value obtained by dividing a force amount increased in an strain range of 0.4% to 4.4% by a total cross-sectional area of fibers in the measurement direction, is 3 MPa to 25 MPa, and E2, which is a value obtained by dividing a ratio a force amount increased in an strain range of −4.8% to −0.8% from a fiber cut point by a total cross-sectional area of fibers in the measurement direction, is 10 MPa to 30 MPa.

E1 is the resistance at which the woven yarns of the base cloth begin to shift. When E1 is 3 MPa or more, the woven yarns of the base cloth are less likely to shift, and opening of the boundary between the inflated part and the non-inflated part i.e., at the seam, when the base cloth is formed into a bag, is less likely to occur. The decrease in airtightness due to opening and the occurrence of bursting due to the passage of hot gas are suppressed. Conversely, when E1 is 25 MPa or less, local opening is less likely to occur. Further, the smaller the value of E1, the harder the base cloth and the less storability is impaired. Specifically, E1 has an appropriate region relative to seam opening. E1 is more preferably 5 MPa to 22 MPa. E2 is the maximum resistance when the woven yarns of the base cloth shift. When E2 is 10 MPa or more, the airtightness of the base cloth itself can be suppressed when the stress on the base cloth increases at high pressure, and the airtightness of the base cloth under high pressure can be maintained. When E2 is 30 MPa or less, local opening is less likely to occur. In particular, when both warp and weft E2 values in an environment of 150° C. are high, the bag body in a high temperature and high-pressure environment can function without bursting while reaching a high ultimate pressure at the time of shock absorption. E2 is more preferably 15 MPa to 25 MPa.

As used herein, the phrase "strain in a force strain characteristic (FS) curve of the base cloth obtained by Edgecomb Resistance measurement in accordance with ASTM D6479" means the ratio of tensile strain (or elongation) relative to the original length.

As used herein, the phrase "total cross-sectional area of fibers in the measurement direction" means the area of the cross-section of a perfect circle calculated from raw yarn fineness.

In the woven fabric base cloth for a material of the present embodiment, the dynamic air permeability of a base cloth part is preferably 400 mm/s or less, and more preferably 350 mm/s or less when measured between 30 kPa and 70 kPa with an initial pressure of 100±5 kPa in accordance with ASTM 6476. The smaller the dynamic air permeability in the range of 400 mm/s or less, the better the airtightness of the airbag bag body and the higher the unfolding pressure. The lower limit of the dynamic air permeability is not particularly limited, but may be 100 mm/s or more.

In the woven fabric base cloth for a material of the present embodiment, from the viewpoint of imparting flexibility to the base cloth, the residual oil amount after finishing is preferably 200 ppm by weight to 800 ppm by weight, more preferably 400 ppm by weight to 600 ppm by weight relative to the base cloth. The residual oil includes a spinning oil agent, a warp-making oil agent, or a softening finishing agent, and is composed of, for example, a smoothing agent, an emulsifier, and an antistatic agent. When the residual oil amount is 800 ppm by weight or less, the smaller the amount, the more the opening is suppressed and the air permeability is suppressed. Conversely, a residual oil amount of 200 ppm by weight or more ensures suitable flexibility of the base cloth, which is advantageous for bag body formation.

Examples of smoothing agents include dioctyl adipate, di(2-octyldodecyl) adipate, 1,6-hexanediol diolate, dioleoyl sebacate, dilauryl azelate, dioleoyl adipate, dilauryl thiodipropionate, dioleoyl thiodipropionate, bisphenol A dilaurate, ethylene glycol diolate, polyethylene glycol dilaurate, 1,4-butanediol diolate, glycerin trilaurate, glycerin triolate, sorbitan triorate, sorbitan tetraolate, trimethylolpropane trilaurate, and pentaerythritol tetraolate.

Examples of emulsifiers and antistatic agents include hydrogenated castor oil triolates and AO adducts thereof, polyoxyethylene lauryl ether, polyoxyethylene oleyl ether, polyoxyethylene lauric acid ester, polyoxyethylene stearic acid ester, polyoxyethylene nonylphenol ether, ethylene oxide adducts of hydrogenated castor oil, ethylene oxide adduct trilaurates of hydrogenated castor oil, and ethylene oxide adduct triolates of hydrogenated castor oil.

Furthermore, as the emulsifier, an anionic surfactant, for example, an inorganic or organic salt such as a higher alcohol sulfate ester sodium salt or an alkyl phosphate ester potassium salt can be used.

The residual oil can be applied by a method using a dedicated nozzle or a touch roller at the time of spinning.

The residual oil can be applied by immersion during aging, scouring, and washing with water, and is subsequently adjusted to a predetermined residual amount by washing with water or scouring.

Another embodiment of the present invention provides a method for manufacturing the woven fabric base cloth for a material, comprising the following steps:

a weaving step;

a step of not scouring or scouring at 70° C. or less;

a step of not drying or performing drying at 70° C. or less; and a step of performing heat treatment at 150° C. or higher, wherein at a final stage of the heat treatment, a tightening width is 1% or more relative to a minimum width in heat treatment.

In the production of the woven fabric base cloth for a material of the present embodiment, a post-weaving process is important for obtaining preferable base cloth properties.

When weaving is performed with a water jet loom, the residual oil component imparted to the base cloth fabric may be a preferable amount due to the water flow, and it is also preferable to proceed to the subsequent step without performing scouring. Furthermore, when scouring is performed to make the amount of residual oil component in the base cloth woven fabric suitable, care must be taken because E1 and E2 may increase excessively if excessive scouring is performed. At that time, the scouring temperature is preferably 70° C. or lower and ambient temperature or higher, more preferably 60° C. or lower and ambient temperature or higher. When there scouring is not performed or scouring is performed at 70° C. or lower, heat setting which sufficiently develops the tightening of the base cloth woven fabric can be obtained in the final process of processing without fully developing the shrinkage force of the woven yarns. As a result, though E1 appears to be excessively high, the seams do not open. Scouring may be performed by washing with water, and a scouring agent may be used. When a scouring agent is used, sodium hydroxide, sodium carbonate, etc., can be used. Furthermore, a chelating agent or a surfactant may be used. Though the application of tension in the warp direction in the scouring process is useful for stabilizing fabric transportation, when the temperature is raised, even if tension is applied to the woven fabric in a wet state, the development of the contractile force of the woven yarns is not suppressed.

Next, it is preferable to heat-set the scoured cloth as-is. When the scoured cloth is dried to prepare for the subsequent step, the drying temperature is preferably 70° C. or lower and ambient temperature or higher. When drying is not performed or is performed at 70° C. or lower, the shrinkage force of the woven yarns is not fully developed, and thus, heat setting which sufficiently develops tightening of the base cloth woven fabric in the final processing step is possible. As a result, though E1 appears to be excessively high, the seams do not open.

In the heat setting (heat treatment) step following after scouring or after drying, the heat setting temperature is preferably 150° C. to 190° C. When the heat setting temperature is 150° C. or higher, sufficient setting is achieved, a base cloth having high E1 and E2 is obtained, and opening is limited and the air permeability is low even at high pressures. There are no cases, as seen when setting is insufficient, where E1 is excessively high and seams open though E2 is high and the air permeability under high pressure is low in the woven fabric tensioned form.

Though a tenter is used in the heat setting step, from the viewpoint of preventing excessive reduction of E1 and E2, it is preferable that a drying drum not be used for drying. This is because when a wet base cloth is dried with a drying drum, E1 and E2 are sometimes decreased due to shrinkage in the width (weft) direction or physical characteristic spots occur due to destabilization of width fixation during the drying process.

When heat setting is performed with a tenter, the overfeed in the warp direction is preferably 0 to 5%, and more preferably 0 to 2%. By adjusting the overfeed, E1 approaches the center of the range of 3 MPa to 25 MPa and E2 approaches the center of the range of 10 MPa to 30 MPa in both 25° C. and 150° C. environments.

Furthermore, when heat setting is performed with a tenter, it is preferable that the heat setting maximum width shrinkage represented by the following formula be 0 to 8%.

Heat setting maximum width shrinkage (%)=[(heat setting inlet width−heat setting minimum width)/heat setting inlet width]×100

Figure 4:
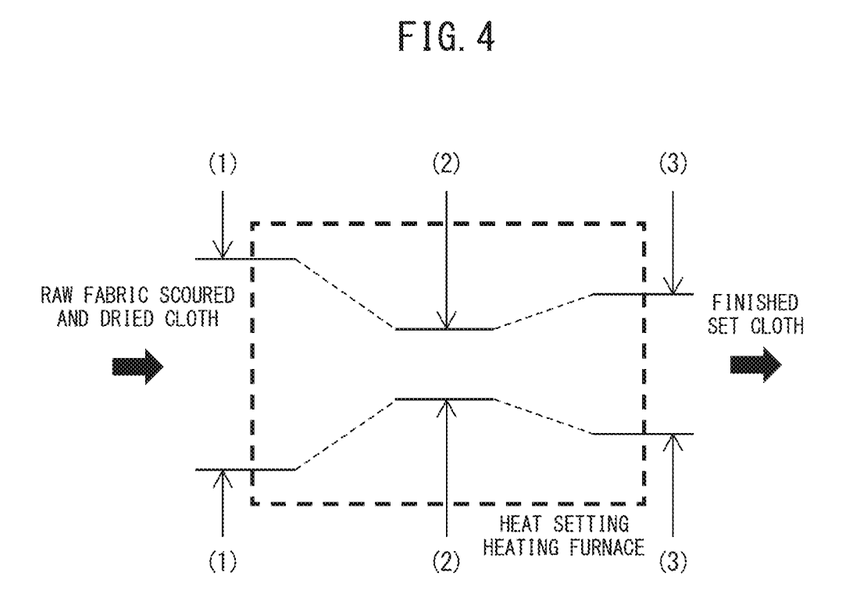
FIG. 4 is a schematic view of a heat-setting (heat-treatment) process in a tenter.

In the formula, the "heat setting inlet width" is the width of the raw fabric at the heat setting heating furnace inlet (heat setting inlet width) indicated by reference sign (1) in FIG. 4, and the "heat setting minimum width" is the minimum width (heat setting minimum width) of the raw fabric in the heat setting heating furnace indicated by the reference sign (2) in FIG. 4.

In order to tighten the woven structure by the heat shrinkage force of the constituent fibers, the width shrinkage ratio is regulated and controlled instead of allowing width shrinkage due to free contraction. Preferably, the smaller the heat setting maximum width in the range of 8% or less, the easier for E1 and E2 to increase. The heat setting maximum width shrinkage is more preferably 6% or less, and further preferably 4% or less.

Further, it is preferable that the heat setting process be performed in multiple stages. In particular, tightening of the base cloth weave structure at the final stage of heat set processing is important.

It is preferable that the heat setting final width shrinkage represented by the following formula be 0 to 6%.

Heat setting final width shrinkage (%)=[(heat setting inlet width−heat setting outlet width)/heat setting inlet width]×100

In the formula, the "heat setting outlet width" is the width (heat set outlet width) of the raw fabric at the heat setting heating furnace outlet indicated by the reference sign (3) in FIG. 4, and the "heat setting inlet width" is the width (heat setting inlet width) of the raw fabric at the heat set heating furnace inlet indicated by the reference sign (1) in FIG. 4.

Further, it is preferable that the tightening amount defined by {heat setting maximum width shrinkage (%)−heat setting final width shrinkage (%)} be 1 to 4%. By making the heat setting final width (heat setting outlet width (3)) greater than the heat setting minimum width (heat setting minimum width (2)), looseness of the structure of the base cloth is suppressed. This is tightening tentering. When the tightening amount is 1% or more, both E1 and E2 can be increased, and a base cloth having low opening and low air permeability can be obtained. The tightening amount is more preferably 2% or more. The tightening effect of the base cloth by making the heat setting final width shrinkage (heat set outlet width (3)) greater than the heat setting minimum width shrinkage (heat set minimum width (2)) is effective on the premise that the heat setting process in the previous stage has a sufficient temperature and the weave structure becomes sufficiently tensioned due to the development of contractile force. When the tightening is 4% or less, the finish of the woven fabric is uniform.

Regarding the weave structure of the woven fabric base cloth for a material of the present embodiment, a plain weave structure is preferable because it is advantageous in terms of force of the base cloth, but other weave structures or a combination designs can also be used.

Examples of the raw material (substance) of the constituent fibers of the woven fabric base cloth for the material of the present embodiment include polyethylene terephthalate, polyamides 6, 610, 46, and 66, and polyethylene naphthalate, polyamide 66 and polyethylene terephthalate are preferable, and polyamide 66 (polyhexamethylene adipamide) is particularly preferable, from the viewpoints of heat resistance, force, and cost.

EXAMPLES

The present invention will be specifically described below by way of Examples and Comparative Examples, but the present invention is not limited to only these Examples.

First, the measurement and evaluation methods used in the Examples, etc., will be described.

(1) Raw Yarn, Disassembled Yarn (Multifilament) Fineness (Dtex), Force (N), Tenacity (cN/Dtex)

The fineness, force, and tenacity of the fibers are measured in accordance with JIS_L1013.

(2) Raw Yarn Oil Amount

The amount (wt %) of oil such as spinning oil contained in the raw yarn is measured in accordance with JIS_L1013 (8.27). A cyclohexane solvent was used as the extraction solvent.

(3) Base Cloth Residual Oil Amount

The residual oil amount is determined by cutting the base cloth, performing Soxhlet extraction with cyclohexane, thereafter, evaporating the extraction solvent, and dividing the residual oil by the weight of the starting base cloth.

(4) Raw Yarn Inter-Yarn Friction

Figure 1:
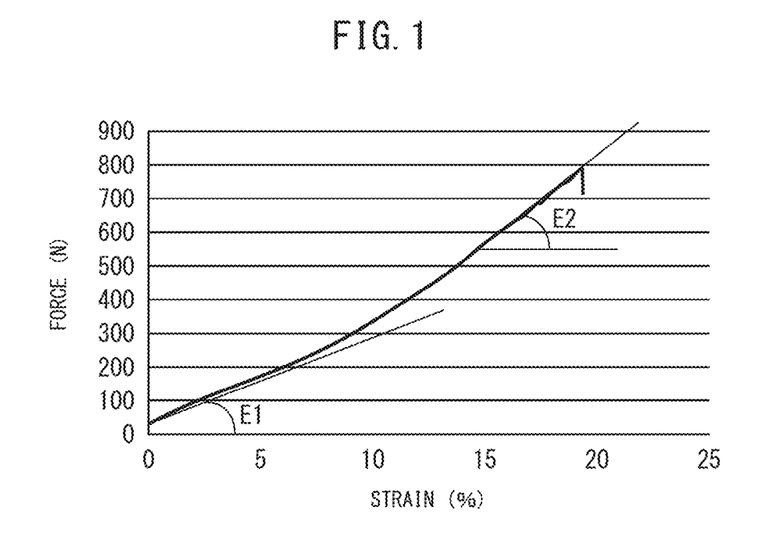
FIG. 1 is a graph detailing an FS curve measured in accordance with ASTM_D6479 and general concepts of E1 and E2.
Figure 2:
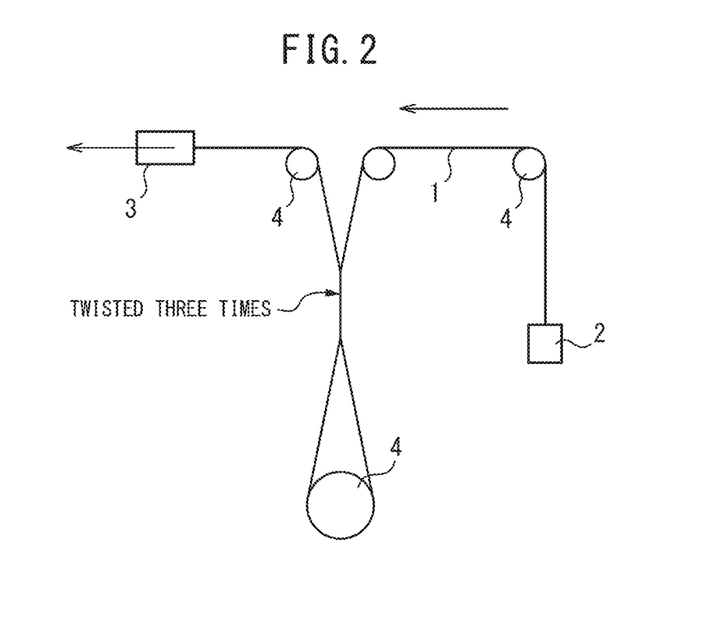
FIG. 2 is a schematic explanatory diagram of inter-fiber friction measurement.

As shown in FIG. 2, the inter-yarn frictional force of the raw yarns is measured by twisting the raw yarn three times to bring it into contact with itself, setting a load on the yarn supply side (weight T1) to 140 g, and measuring the take-up tension (load cell T2) after twisting. T2/T1 is defined as the inter-yarn friction force f.

(5) Force (N) and Strain (%) of Base Cloth

The force and strain of the base cloth are measured by the strip method of JIS_L1096.

(6) Warp/Weft Yarn Weaving Density

For the warp/weft yarn weaving density, five points are measured for each of the warp and weft using an FX3255 manufactured by TEXTEST AG, and the average thereof is used.

(7) E1

E1 is defined as a value obtained by dividing the force amount increased in the strain range of 0.4% to 4.4% measured by the method of ASTM_D6479 in both 25° C. (ambient temperature) and 150° C. environments by a value calculated as the total cross-sectional area of the fibers in the measurement direction shown in formula 1 below. The sample width is 5 cm. The sample is attached at intervals of 20 cm with combing blades and gripping tools, and this is used as the original length of the sample, and the ratio of tensile strain is defined as the strain.

$$A=(d*D*(5/2.54))/(\rho*10^{10}) \quad \text{formula 1}$$

In the formula, A is the total cross-sectional area of the fibers ($m^2$), d is the fiber fineness (dtex), D is the number of yarns per 2.54 cm in weaving density in the gripping width direction of the sample, and p is the density 1.14 ($g/cm^3$) of nylon 66.

(8) E2

E2 is calculated using the same formula as E1 from the force amount increased in the strain range of 4.8% to −0.8% from the cutting point (point where the measurement load suddenly drops) measured in both of 25° C. (ambient temperature) and 150° C. environments by the method of ASTM_D6479 described regarding E1 above. The sample width is 5 cm.

(9) Opening

Figure 3:
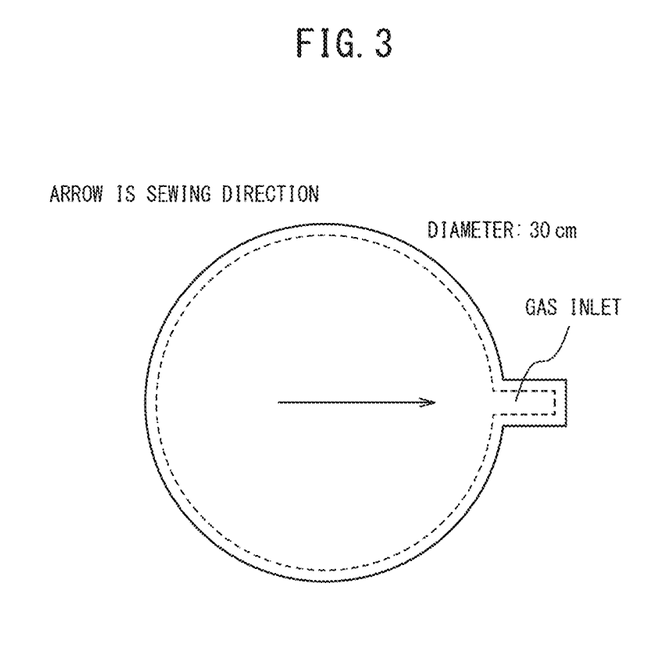
FIG. 3 is schematic view of a deployment evaluation bag.

As shown in FIG. 3, a bag having a diameter of 30 cm and a gas inlet having a width of 8 cm and a length of 10 cm is prepared by sewing the base cloth with a 1350 dtex twisted sewing thread at 65 stitches/dm, this is inverted to obtain an airbag, the obtained airbag is arranged in a hot-air dryer at 150° C. and allowed to stand for 10 minutes. Thereafter, while still in the dryer, helium gas is instantaneously supplied under the conditions of a pressure of 5 MPa, an orifice of 0.6 inches, and a tank capacity of 250 cc using a Microsys CGS system to deploy the airbag, and the airbag is then removed. After sufficient cooling, the maximum opening of the sewn part of the bag is measured with calipers.

(10) Dynamic Air Permeability of Base Cloth

The dynamic air permeability of a base cloth part is measured as the average of the dynamic air permeability between 30 kPa and 70 kPa with an initial pressure of 100±5 kPa in accordance with ASTM_D6476.

(11) High Temperature Proximity Deployment Evaluation (High Temperature Burst Resistance)

A driver-side airbag having an internal volume of 60 L is sewn without a vent hole, and a pyroinflator having a tank pressure of 200 kPa is attached thereto. Immediately after heating the entirety thereof in an oven at 80° C., it is arranged on an evaluation table. The pyroinflator is ignited before the temperature drops. The airbag is deployed toward a proximity plate at a distance of 15 cm. Airbags which do not break and which have no change in the sewn part are evaluated as "excellent." Those which do not break but have some irregularities such as frayed base cloth at the sewn part are evaluated as "good." Those which broke are evaluated as "poor."

Example 1

Polyamide 66 resin having a relative viscosity of 80 in 90% formic acid was melt-spun at 300° C., 0.8% by weight of spinning oil was applied to the fibers with a touch roller while cooling, and thereafter, the fibers were stretched 4.9 times with a stretching roller at 200° C. and entangled with compressed air to obtain a raw yarn having a fineness of 470 dtex and a filament number of 136. The force of the raw yarn was 40.5 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 47 fibers/inch. Thereafter, the yarn was washed with water in a three-stage bath at 30-30-30° C. for a total of 40 seconds, and a setting process was performed continuously with a pin tenter without the use of a drying drum under the conditions of an inlet temperature of 80° C., a temperature of 190° C. during heat setting, and a final temperature of 130° C. for a total of 50 seconds, with an overfeed of 0%, a heat setting maximum width shrinkage of 6%, a heat setting final width shrinkage of 4%, and a tightening amount of 2%. The desired base cloth of warp/weft 49 fibers/inch was obtained. The obtained disassembled yarn tenacity and various physical properties of the base cloth are shown in Tables 1 and 2 below.

Example 2

The desired base cloth of warp/weft 53 fibers/inch was obtained using the same fibers as Example 1, under the same production conditions except that the warp/weft density during weaving was 51 fibers/inch, and setting was performed under the same conditions as Example 1. The obtained disassembled yarn tenacity and various physical properties of the base cloth are shown in Tables 1 and 2 below.

Example 3

The desired base cloth of warp/weft 55 fibers/inch was obtained using the same fibers as Example 1, under the same production conditions except that the warp/weft density during weaving was 53 fibers/inch, and setting was performed under the same conditions as Example 1. The obtained disassembled yarn tenacity and various physical properties of the base cloth are shown in Tables 1 and 2 below.

Example 4

Polyamide 66 resin of 80 in 90% formic acid was melt-spun at 300° C., 0.8% by weight of spinning oil was applied to the fibers with a touch roller while cooling, and thereafter, the fibers were stretched 4.8 times with a stretching roller at 200° C. and entangled with compressed air to obtain a raw yarn having a fineness of 350 dtex and a filament number of 136. The force of the raw yarn was 30.0 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 58 fibers/inch. Thereafter, the same processing as Example 1 was performed to obtain the desired base cloth of warp/weft 60 fibers/inch. The obtained disassembled yarn tenacity and various physical properties of the base cloth are shown in Tables 1 and 2 below.

Example 5

Polyamide 66 resin having a relative viscosity of 80 in 90% formic acid was melt-spun at 300° C., 0.8% by weight of spinning oil was applied to the fibers with a touch roller while cooling, and thereafter, the fibers were stretched 4.7 times with a stretching roller at 200° C. and entangled with compressed air to obtain a raw yarn having a fineness of 235 dtex and a filament number of 72. The force of the raw yarn was 20.0 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 69 fibers/inch. Thereafter, the same processing as Example 1 was performed to obtain the desired base cloth of 74 fibers/inch. The obtained disassembled yarn tenacity and various physical properties of the base cloth are shown in Tables 1 and 2 below.

TABLE 1

|  |  | Ex 1 | Ex 2 | Ex 3 | Ex 4 | Ex 5 |
| --- | --- | --- | --- | --- | --- | --- |
| Raw material |  | Nylon 66 | Nylon 66 | Nylon 66 | Nylon 66 | Nylon 66 |
| Raw yarn force | N | 40.5 | 40.5 | 40.5 | 30 | 20 |
| Raw yarn fineness | dtex | 470 | 470 | 470 | 350 | 235 |

TABLE 1-continued

|  |  | Ex 1 | Ex 2 | Ex 3 | Ex 4 | Ex 5 |
|---|---|---|---|---|---|---|
| Raw yarn tenacity | cN/dtex | 8.62 | 8.62 | 8.62 | 8.57 | 8.51 |
| Raw yarn oil amount | wt % | 0.8 | 0.8 | 0.8 | 0.8 | 0.8 |
| Raw yarn boiling water shrinkage rate | % | 7.8 | 7.8 | 7.8 | 9.0 | 7.8 |
| Single-fiber number | fibers | 136 | 136 | 136 | 136 | 72 |
| Single-fiber fineness | dtex | 3.6 | 3.6 | 3.6 | 2.7 | 3.4 |
| Inter-fiber friction | f = T2/T1 | 2.4 | 2.4 | 2.4 | 2.2 | 2.3 |
| Density (warp/weft average) | Fibers/inch | 49 | 53 | 55 | 60 | 74 |
| CF | (√d) * (warp density + weft density) | 2176 | 2346 | 2442 | 2308 | 2331 |
| Washing rate | m/min | 30 | 30 | 30 | 30 | 30 |
| Scouring method |  | Washing | Washing | Washing | Washing | Washing |
| Washing temp | X-Y-Z (° C.) | 30-30-30 | 30-30-30 | 30-30-30 | 30-30-30 | 30-30-30 |
| Drying drum temp | (° C.) | N/A | N/A | N/A | N/A | N/A |
| Heat-setting temp | m/min | 30 | 30 | 30 | 30 | 30 |
| Tenter temp (max) | ° C. | 190 | 190 | 190 | 190 | 190 |
| Overfeed | % | 0 | 0 | 0 | 0 | 0 |
| Heat-setting maximum width | % | 6 | 6 | 6 | 6 | 6 |
| Heat-setting final width | % | 4 | 4 | 4 | 4 | 4 |
| Tightening amount | % | 2 | 2 | 2 | 2 | 2 |
| Base cloth residual oil amount | PPM | 300 | 600 | 750 | 500 | 300 |

TABLE 2

|  |  | Ex 1 | Ex 2 | Ex 3 | Ex 4 | Ex 5 |
|---|---|---|---|---|---|---|
| Dismantled fiber force | N | 36.0 | 36.0 | 36.2 | 24.5 | 17.2 |
| Dismantled fiber fineness | dtex | 493 | 490 | 493 | 370 | 248 |
| Dismantled fiber tenacity | cN/dtex | 7.30 | 7.35 | 7.34 | 6.62 | 6.94 |
| Base cloth force (warp) | N/cm | 670 | 720 | 740 | 600 | 480 |
| Base cloth force (weft) | N/cm | 690 | 760 | 770 | 605 | 490 |
| Base cloth strain (warp) | % | 40 | 43 | 40 | 40 | 29 |
| Base cloth strain (weft) | % | 33 | 32 | 30 | 34 | 28 |
| E1 (warp/ambient temp) | MPa | 6.0 | 8.1 | 8.5 | 16.5 | 13.6 |
| E1 (weft/ambient temp) | MPa | 17.0 | 19.4 | 20.4 | 21.0 | 17.5 |
| E1 (warp/150° C.) | MPa | 5.5 | 8.8 | 9.5 | 9.1 | 4.8 |
| E1 (weft/150° C.) | MPa | 15.4 | 16.4 | 17.7 | 11.9 | 16.3 |
| E2 (warp/ambient temp) | MPa | 23.3 | 27.4 | 27.5 | 28.0 | 12.4 |
| E2 (weft/ambient temp) | MPa | 26.0 | 28.0 | 29.5 | 28.0 | 25.4 |
| E2 (warp/150° C.) | MPa | 15.3 | 17.6 | 18.5 | 23.3 | 23.6 |
| E2 (weft/150° C.) | MPa | 19.3 | 21.8 | 23.3 | 26.1 | 16.7 |
| Opening | mm | 4 | 3 | 4 | 3 | 2 |
| Dynamic air permeability | mm/s | 380 | 360 | 320 | 330 | 330 |
| High-temp bursting resistance |  | Excellent | Excellent | Excellent | Excellent | Excellent |

Comparative Example 1

Using the same fibers as Example 1, the same weaving was performed. Thereafter, the yarn was washed with water in a three-stage bath at 30-30-30° C. for a total of 40 seconds, drum drying was performed at 110° C. for 60 seconds, and after drying, the yarn was wound once on the drum. Next, the yarn was immersed in a silicon resin emulsion bath having a solid content of 1500 ppm, and thereafter, a setting process was performed with a pin tenter under the conditions of an inlet temperature of 80° C., a temperature of 190° C. during heat setting, and a final temperature of 130° C. for a total of 50 seconds, with an overfeed of 4%, a heat setting maximum width shrinkage of 2%, a heat setting final width shrinkage of 2%, and a tightening amount of 0% to obtain the desired base cloth. The obtained disassembled yarn tenacity and various physical properties of the base cloth are shown in Tables 3 and 4 below. Both E1 and E2 were low, the high-pressure air permeability was high, and the seam opening was significant. The high temperature proximity deployment evaluation was good.

Comparative Example 2

Polyamide 66 resin having a relative viscosity of 80 in 90% formic acid was melt-spun at 300° C., 0.8% by weight of an oil agent containing 30% by weight of bisphenol A in the spinning oil of Example 1 was applied to the fibers with a touch roller while cooling, and thereafter, the fibers were stretched 4.9 times with a stretching roller at 200° C. and entangled with compressed air to obtain a raw yarn having a fineness of 470 dtex and a filament number of 136. The force of the raw yarn was 40.5 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 51 fibers/inch. Thereafter, the yarn was washed with water in a three-stage bath at 80-80-80° C. for a total of 40 seconds, drying was performed with a drying drum at 110° C. for 40 seconds without winding, and a setting process was performed with a pin tenter under the conditions of a temperature of 100° C. for a total of 50 seconds, with an overfeed of 4%, a heat setting maximum width shrinkage of 2%, a heat setting final width shrinkage of 2%, and a tightening amount of 0% to obtain the desired base cloth of 53 fibers/inch. The obtained disassembled yarn tenacity and various physical properties of the base cloth are shown in Tables 3 and 4 below. E2 was excessively high, the high-pressure air permeability was high, and seam opening was significant. The high temperature proximity deployment evaluation was good.

Comparative Example 3

Polyamide 66 resin having a relative viscosity of 80 in 90% formic acid was melt-spun at 300° C., 0.8% by weight of spinning oil was applied to the fibers with a touch roller while cooling, and thereafter, the fibers were stretched 4.0 times with a stretching roller at 200° C. and entangled with compressed air to obtain a raw yarn having a fineness of 470 dtex and a filament number of 136. The force of the raw yarn was 35.0 N. Using this raw yarn, the same processing as Example 1 was performed to obtain the desired base cloth. The obtained disassembled yarn tenacity and various physical properties of the base cloth are shown in Tables 3 and 4 below. E1 and E2 were low, the high-pressure air permeability was high, and seam opening was somewhat significant. The high temperature proximity deployment evaluation was poor.

Comparative Example 4

Polyamide 66 resin having a relative viscosity of 80 in 90% formic acid was melt-spun at 300° C., 1.5% by weight of spinning oil was applied to the fibers with a touch roller while cooling, and thereafter, the fibers were stretched 4.9 times with a stretching roller at 200° C. and entangled with compressed air to obtain a raw yarn having a fineness of 470 dtex and a filament number of 136. The force of the raw yarn was 40.5 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 51 fibers/inch. Thereafter, the yarn was not washed in a basin, and a setting process was performed with a pin tenter under the conditions of an inlet temperature of 80° C., a temperature of 190° C. during heat setting, and a final temperature of 130° C. for a total of 50 seconds, with an overfeed of 0%, a heat setting maximum width shrinkage of 6%, a heat setting final width shrinkage of 4%, and a tightening amount of 2% to obtain the desired base cloth of 53 fibers/inch. The obtained disassembled yarn tenacity and various physical properties of the base cloth are shown in Tables 3 and 4 below. E1 and E2 were low, the high-pressure air permeability was high, and seam opening was significant. The high temperature proximity deployment evaluation was good.

Comparative Example 5

Polyamide 66 resin having a relative viscosity of 80 in 90% formic acid was melt-spun at 300° C., 0.5% by weight of spinning oil was applied to the fibers with a touch roller while cooling, and thereafter, the fibers were stretched 4.9 times with a stretching roller at 200° C. and entangled with compressed air to obtain a raw yarn having a fineness of 470 dtex and a filament number of 136. The force of the raw yarn was 40.5 N. Using this raw yarn, weaving was performed using an LWT710 manufactured by Toyota Industries Corporation, without sizing, at a drafting width of 220 cm, a weaving warp tension 0.24 cN/dtex, using two 22 dtex nylon 6 monofilaments for the binding yarns on each of both selvedge portions, and on each of both ends, ten additional yarns of the same nylon 66 as the foundation yarn, to obtain a plain weave raw fabric having a warp/weft density of 49 fibers/inch. Thereafter, the yarn was immersed in a first-stage bath containing a nonionic surfactant at 30° C. for 10 seconds, the yarn was then washed with water in a two to three-stage bath at 90-90° C. for a total of 30 seconds, and a setting process was performed continuously with a pin tenter without the use of a drying drum under the conditions of an inlet temperature of 80° C., a temperature of 190° C. during setting, and a final temperature of 130° C. for a total of 50 seconds, with an overfeed of 0%, a heat setting maximum width shrinkage of 6%, a heat setting final width shrinkage of 4%, and a tightening amount of 2% to obtain the desired base cloth of 53 fibers/inch. The obtained disassembled yarn tenacity and various physical properties of the base cloth are shown in Tables 3 and 4 below. E2 was excessively high, the high-pressure air permeability was high, and seam opening was significant. The high temperature proximity deployment evaluation was poor.

Comparative Example 6

Using the same raw yarn as Example 1, the same weaving was performed, after the raw fabric was produced, it was washed with water in a three-stage bath at 30-30-30° C. for a total of 40 seconds, and a setting process was performed continuously with a pin tenter without the use of a drying drum under the conditions of an inlet temperature of 80° C., a temperature of 190° C. during setting, and a final temperature of 130° C. for a total of 50 seconds, with an overfeed of 0%, a heat setting maximum width shrinkage of 6%, a heat setting final width shrinkage of 6%, and a tightening amount of 0% to obtain the desired base cloth. The obtained disassembled yarn tenacity and various physical properties of the base cloth are shown in Tables 3 and 4 below. E1 and E2 were low, the high-pressure air permeability was high, and seam opening was significant. The high temperature proximity deployment evaluation was good.

Comparative Example 7

Weaving was performed in the same manner as Example 2, and after the raw fabric was produced, it was washed with water in a three-stage bath at 60-90-90° C. for a total of 40 seconds, and a setting process was performed continuously with a pin tenter without the use of a drying drum under the conditions of an inlet temperature of 80° C., a temperature of 190° C. during setting, and a final temperature of 130° C. for a total of 50 seconds, with an overfeed of 0%, a heat setting maximum width shrinkage of 6%, a heat setting final width shrinkage of 4%, and a tightening amount of 2% to obtain the desired base cloth of 53 fibers/inch. The obtained disassembled yarn tenacity and various physical properties of the base cloth are shown in Tables 3 and 4 below. E2 was excessively high, the high-pressure air permeability was high, and seam opening was significant. The high temperature proximity deployment evaluation was poor.

Comparative Example 8

Weaving was performed in the same manner as Example 2, and after the raw fabric was produced, it was washed with water in a three-stage bath at 30-30-30° C. for a total of 40 seconds, drum drying was performed at 110° C. for 60 seconds, and after drying, the yarn was wound once on the drum. Next, a setting process was performed with a pin tenter under the conditions of an inlet temperature of 80° C., a temperature of 190° C. during setting, and a final temperature of 130° C. for a total of 50 seconds, with an overfeed of 0%, a heat setting maximum width shrinkage of 6%, a heat setting final width shrinkage of 4%, and a tightening amount of 2% to obtain the desired base cloth of 53 fibers/inch. The obtained disassembled yarn tenacity and various physical properties of the base cloth are shown in Tables 3 and 4 below. E2 was excessively high, the high-pressure air permeability was high, and seam opening was significant. The high temperature proximity deployment evaluation was poor.

Comparative Example 9

Weaving was performed in the same manner as Example 2, and after the raw fabric was produced, it was washed with water in a three-stage bath at 30-30-30° C. for a total of 40 seconds, and a setting process was performed continuously with a pin tenter without the use of a drying drum under the conditions of an inlet temperature of 80° C., a temperature of 130° C. during setting, and a final temperature of 130° C. for a total of 50 seconds, with an overfeed of 0%, a heat setting maximum width shrinkage of 6%, a heat setting final width shrinkage of 4%, and a tightening amount of 2% to obtain the desired base cloth of 53 fibers/inch. The obtained disassembled yarn tenacity and various physical properties of the base cloth are shown in Tables 3 and 4 below. E2 was excessively high, the high-pressure air permeability was high, and seam opening was significant. The high temperature proximity deployment evaluation was poor.

TABLE 3

|  |  | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 |
| --- | --- | --- | --- | --- | --- | --- | --- | --- | --- | --- |
| Raw material |  | Nylon 66 | Nylon 66 | Nylon 66 | Nylon 66 | Nylon 66 | Nylon 66 | Nylon 66 | Nylon 66 | Nylon 66 |
| Raw yarn force | N | 40.5 | 40.5 | 35.0 | 40.5 | 40.5 | 40.5 | 40.5 | 40.5 | 40.5 |
| Raw yarn fineness | dtex | 470 | 470 | 470 | 470 | 470 | 470 | 470 | 470 | 470 |
| Raw yarn tenacity | cN/dtex | 8.62 | 8.62 | 7.45 | 8.62 | 8.62 | 8.62 | 8.62 | 8.62 | 8.62 |
| Raw yarn oil amount | wt % | 0.8 | 0.8 | 0.8 | 1.5 | 0.8 | 0.8 | 0.8 | 0.8 | 0.8 |
| Raw yarn boiling water shrinkage rate | % | 7.8 | 7.8 | 6.0 | 7.8 | 7.8 | 7.8 | 7.8 | 7.8 | 7.8 |
| Single-fiber number | fibers | 136 | 72 | 136 | 136 | 136 | 136 | 136 | 136 | 136 |
| Single-fiber fineness | dtex | 3.5 | 6.5 | 3.5 | 3.5 | 3.5 | 3.5 | 3.6 | 3.6 | 3.6 |
| Inter-fiber friction | f = T2/T1 | 2.0 | 3.0 | 2.6 | 2.0 | 2.8 | 2.8 | 2.4 | 2.4 | 2.4 |
| Density (warp/weft average) | Fibers/inch | 53 | 53 | 53 | 53 | 53 | 53 | 49 | 49 | 49 |
| CF | ($\sqrt{d}$) * (warp density + weft density) | 2298 | 2298 | 2298 | 2298 | 2298 | 2298 | 2176 | 2176 | 2176 |
| Washing rate | m/min | 30 | 30 | 30 | 30 | 30 | 30 | 30 | 30 | 30 |
| Scouring method |  | Washing | Washing | Washing | Washing | Washing with scouring agent | Washing | Washing | Washing | Washing |
| Washing temp | X-Y-Z (° C.) | 30-30-30 | 80-80-80 | 30-30-30 | 30-30-30 | 30-90-90 | 30-30-30 | 60-90-90 | 30-30-30 | 30-30-30 |
| Drying dram temp | (° C.) | 110 | 110 | N/A | N/A | N/A | N/A | N/A | 100° C. | N/A |
| Heat-setting temp | m/min | 30 | 30 | 30 | 30 | 30 | 30 | 30 | 30 | 30 |
| Tenter temp (max) | ° C. | 180 | 100 | 190 | 190 | 190 | 190 | 190 | 190 | 130 |
| Overfeed | % | 4 | 4 | 0 | 0 | 0 | 0 | 0 | 0 | 0 |
| Heat-setting maximum width | % | 2 | 2 | 6 | 6 | 6 | 6 | 6 | 6 | 6 |
| Heat-setting final width | % | 2 | 2 | 4 | 4 | 4 | 6 | 4 | 4 | 4 |
| Tightening amount | % | 0 | 0 | 2 | 2 | 2 | 0 | 2 | 2 | 2 |
| Base cloth residual oil amount | PPM | 600 | 620 | 450 | 1000 | 100 | 500 | 300 | 300 | 300 |

TABLE 4

|  |  | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 |
| --- | --- | --- | --- | --- | --- | --- | --- | --- | --- | --- |
| Dismantled fiber force | N | 36.0 | 36.0 | 30.2 | 36.1 | 36.0 | 36.2 | 36.0 | 36.0 | 36.0 |
| Dismantled fiber fineness | dtex | 493 | 490 | 493 | 492 | 490 | 490 | 493 | 493 | 490 |
| Dismantled fiber tenacity | cN/dtex | 7.30 | 7.35 | 6.13 | 7.34 | 7.35 | 7.39 | 7.3 | 7.3 | 7.35 |
| Base cloth force (warp) | N/cm | 630 | 630 | 650 | 680 | 590 | 630 | 720 | 710 | 730 |
| Base cloth force(weft) | N/cm | 655 | 655 | 660 | 710 | 570 | 660 | 750 | 750 | 760 |
| Base cloth strain(warp) | % | 38 | 38 | 44 | 39 | 37 | 37 | 42 | 40 | 39 |
| Base cloth strain(weft) | % | 30 | 30 | 36 | 33 | 29 | 29 | 33 | 33 | 32 |

TABLE 4-continued

|  |  | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 |
|---|---|---|---|---|---|---|---|---|---|---|
| E1 (warp/ambient temp) | MPa | 1.0 | 17.5 | 2.5 | 2.3 | 28.3 | 3.3 | 27.8 | 26.0 | 27.0 |
| E1 (weft/ambient temp) | MPa | 5.5 | 28.8 | 10.8 | 7.7 | 33.3 | 7.8 | 34.0 | 31.2 | 33.0 |
| E1 (warp/150° C.) | MPa | 1.0 | 15.5 | 1.1 | 1.1 | 23.1 | 0.8 | 24.1 | 24.0 | 24.2 |
| E1 (weft/150° C.) | MPa | 8.8 | 25.5 | 8.9 | 5.3 | 28.5 | 6.3 | 27.5 | 28.1 | 28.9 |
| E2 (warp/ambient temp) | MPa | 2.0 | 25.5 | 3.3 | 8.8 | 22.2 | 3.5 | 24.1 | 26.1 | 25.1 |
| E2 (weft/ambient temp) | MPa | 12.0 | 33.8 | 11.3 | 14.8 | 26.1 | 10.8 | 27.6 | 23.5 | 26.5 |
| E2 (warp/150° C.) | MPa | 2.3 | 24.1 | 0.8 | 4.8 | 19.1 | 1.1 | 23.0 | 25.7 | 22.2 |
| E2 (weft/150° C.) | MPa | 5.5 | 29.4 | 10.8 | 7.7 | 25.5 | 9.7 | 27.4 | 22.4 | 27.2 |
| Opening | mm | 8 | 8 | 6 | 10 | 9 | 8 | 8.5 | 7.5 | 8.5 |
| Dynamic air permeability | mm/s | 430 | 300 | 460 | 440 | 280 | 380 | 270 | 290 | 290 |
| High-temp bursting resistance |  | Good | Good | Poor | Good | Poor | Good | Poor | Poor | Poor |

In the base cloths of Examples 1 to 5, E1 and E2 were within the predetermined ranges, whereby opening of the sewn part, which is the boundary between the inflated part and the non-inflated part when formed into a bag, was suppressed, the dynamic air permeability of the base cloth part was low in the range of 400 mm/s or less, and the characteristic of a low likelihood of bursting even at high temperatures could be exhibited. Conversely, in the base cloths of Comparative Examples 1 to 9, E1 and E2 were not within the predetermined ranges, whereby opening of the sewn part, which is the boundary between the inflated part and the non-inflated part when formed into a bag, is significant, the dynamic air permeability of the base cloth part was not low, and the characteristic of a low likelihood of bursting even at high temperatures could not be exhibited.

INDUSTRIAL APPLICABILITY

Since opening of the sewn part, which is the boundary between the inflated part and the non-inflated part when formed into a bag, is suppressed, the dynamic air permeability is low, and the characteristic of a low likelihood of bursting even at high temperatures could be exhibited, whereby the woven fabric base cloth for a material according to the present invention can be suitably used as a base cloth for a material, and in particular, as a base cloth for an airbag.

REFERENCE SIGNS LIST 1 yarn
2 weight (T1)
3 load cell (T2)
4 pulley
(1) heat-setting inlet width
(2) heat-setting minimum width
(3) heat-setting outlet width

The invention claimed is:

1. A woven fabric base cloth for a material, which is composed of fibers having a yarn tenacity of 6.6 cN/dtex to 8.5 cN/dtex when dissembled from the base cloth, and in which a cloth surface is not subjected to resin coating, lamination, or a resin impregnation treatment, wherein in a force strain curve (FS) of the woven fibers obtained by Edgecomb Resistance measurement in accordance with ASTM D6479, for both warp and weft directions, in both 25° C. and 150° C. environments, E1, which is a value obtained by dividing a force amount increased in an strain range of 0.4% to 4.4% by a total cross-sectional area of fibers in the measurement direction, is 3 MPa to 25 MPa, and E2, which is a value obtained by dividing a ratio a force amount increased in an strain range of −4.8% to −0.8% from a fiber breaking point by a total cross-sectional area of fibers in the measurement direction, is 10 MPa to 30 MPa.

2. The woven fabric base cloth for a material according to claim 1, wherein a dynamic air permeability of a base cloth part when measured, in accordance with ASTM 6476, between 30 kPa and 70 kPa with an initial pressure of 100±5 kPa is 400 mm/s or less.

3. The woven fabric base cloth for a material according to claim 1, wherein a residual oil amount is 200 ppm by weight to 800 ppm by weight with respect to the base cloth.

4. The woven fabric base cloth for a material according to claim 1, wherein a weave structure is a plane weave.

5. The woven fabric base cloth for a material according to claim 1, wherein a raw material of the fibers constituting the base cloth is polyhexamethylene adipamide.

6. An airbag manufactured using the woven fabric base cloth for a material according to claim 1.

7. A method for manufacturing the woven fabric base cloth for a material according to claim 1, comprising the following steps:
 a weaving step;
 a step of not scouring or scouring at 70° C. or less;
 a step of not drying or performing drying at 70° C. or less; and
 a step of performing heat treatment at 150° C. or higher, wherein at a final stage of the heat treatment, a tightening width is 1% or more relative to a minimum width in heat treatment.

* * * * *